United States Patent
HomChaudhuri et al.

(10) Patent No.: US 10,524,161 B2
(45) Date of Patent: Dec. 31, 2019

(54) DELAY SPREAD ESTIMATION AND UTILIZATION

(71) Applicant: QUALCOMM Incorporated, San Diego, CA (US)

(72) Inventors: Sandip HomChaudhuri, San Jose, CA (US); Alireza Raissinia, Monte Sereno, CA (US); James Gardner, San Ramon, CA (US); Sumeet Kumar, San Jose, CA (US); Vincent Knowles Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 359 days.

(21) Appl. No.: 14/464,019

(22) Filed: Aug. 20, 2014

(65) Prior Publication Data

US 2016/0057656 A1 Feb. 25, 2016

(51) Int. Cl.
*H04W 28/04* (2009.01)
*H04W 24/02* (2009.01)
*H04W 28/02* (2009.01)

(52) U.S. Cl.
CPC .......... *H04W 28/04* (2013.01); *H04W 24/02* (2013.01); *H04W 28/0236* (2013.01)

(58) Field of Classification Search
CPC .............. H04W 28/048; H04W 24/02; H04W 28/0236; H04L 25/0216; H04L 25/03044; H04L 25/03343
See application file for complete search history.

(56) References Cited

U.S. PATENT DOCUMENTS

| 6,069,922 A | * | 5/2000 | Dyke | ........................ H04L 5/02 370/204 |
| 6,125,124 A | * | 9/2000 | Junell | ................ H04L 25/0216 370/208 |

(Continued)

FOREIGN PATENT DOCUMENTS

| CN | 101022442 A | 8/2007 |
| CN | 101136884 A | 3/2008 |

(Continued)

OTHER PUBLICATIONS

ISA/EPO, International Search Report and Written Opinion of the International Searching Authority, Int'l. App. No. PCT/US2015/044455, dated Oct. 15, 2015, European Patent Office, Rijswijk, NL 12 pgs.

(Continued)

*Primary Examiner* — Alex Skripnikov
*Assistant Examiner* — Richard Schnell
(74) *Attorney, Agent, or Firm* — Holland & Hart LLP; Kevin M. Donnelly

(57) ABSTRACT

Methods, systems, and devices are described for wireless communication at a wireless communication device. A wireless communication device may receive a data frame and use it to estimate a residual channel length (RCL). The device may then modify a finite impulse response (FIR) filter based on the estimated RCL. For example, the device may add additional taps to the FIR filter. The device may continue to adjust the FIR filter until the RCL is at or near zero. In some cases, the wireless communication device may send an indication to the transmitting device to adjust an FIR filter based on the estimated RCL. In some cases, the length of a guard interval may also be adjusted based on the estimated RCL.

26 Claims, 14 Drawing Sheets

(56) References Cited

U.S. PATENT DOCUMENTS

| | | | |
|---|---|---|---|
| 6,597,745 B1* | 7/2003 | Dowling | H04L 25/03343 375/240.18 |
| 7,085,317 B2* | 8/2006 | Malladi | H04L 25/03019 375/152 |
| 7,424,048 B2 | 9/2008 | Parker | |
| 7,480,235 B2 | 1/2009 | Fujii et al. | |
| 8,537,759 B2 | 9/2013 | Ljung et al. | |
| 9,020,022 B1* | 4/2015 | Warner | H04L 7/0058 375/232 |
| 2003/0043927 A1* | 3/2003 | Suzuki | H04L 27/2628 375/260 |
| 2004/0213145 A1* | 10/2004 | Nakamura | H04L 5/0016 370/208 |
| 2005/0117660 A1* | 6/2005 | Vialle | H04B 1/7115 375/299 |
| 2005/0157801 A1* | 7/2005 | Gore | H04L 25/0202 375/260 |
| 2006/0029164 A1* | 2/2006 | Hwang | H04L 25/03019 375/340 |
| 2007/0159957 A1* | 7/2007 | Ljung | H04L 27/2646 370/208 |
| 2008/0310519 A1 | 12/2008 | Seyedi-Esfahani et al. | |
| 2009/0028220 A1* | 1/2009 | Roh | H04L 25/0216 375/136 |
| 2009/0285086 A1* | 11/2009 | Adachi | H04L 27/2665 370/210 |
| 2011/0191657 A1* | 8/2011 | Bliss | H03M 13/05 714/784 |
| 2012/0020240 A1* | 1/2012 | Miura | H04J 11/0023 370/252 |
| 2012/0027048 A1* | 2/2012 | Lindoff | H04L 25/03006 375/140 |
| 2013/0028346 A1* | 1/2013 | Hottinen | H04W 16/14 375/285 |
| 2014/0294124 A1* | 10/2014 | Atungsiri | H04L 1/0017 375/340 |

FOREIGN PATENT DOCUMENTS

| | | |
|---|---|---|
| CN | 101359926 A | 2/2009 |
| EP | 1359684 A1 | 11/2003 |
| JP | 2005303826 A | 10/2005 |
| JP | 2006325063 A | 11/2006 |
| WO | WO-2004075497 A1 | 9/2004 |
| WO | WO-2008116480 A1 | 10/2008 |
| WO | WO-2014037321 A1 | 3/2014 |

OTHER PUBLICATIONS

IPEA/EP, Second Written Opinion of the International Preliminary Examining Authority, Int'l App. No. PCT/US2015/044455, dated Jul. 19, 2016, European Patent Office, Munich, DE, 7 pgs.

* cited by examiner

DELAY SPREAD ESTIMATION AND UTILIZATION

FIELD OF DISCLOSURE

The following relates generally to wireless communication, and more specifically to delay spread estimation and utilization.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power).

A wireless communications network may include a number of network devices, e.g., an access point (AP), that can support communication for a number of wireless devices. A wireless device may communicate with a network device bi-directionally. For example, in a wireless local area network (WLAN), a station (STA) may communicate with an associated AP via downlink and uplink. The downlink (or forward link) refers to the communication link from the AP to the station, and the uplink (or reverse link) refers to the communication link from the station to the AP.

In some cases, wireless transmissions may be prepended by a guard interval separating data symbols. Use of a guard interval may result in a lower data rate because the associated time and frequency resources may not be used for transmitting new data. However, the guard interval may mitigate inter-symbol interference (ISI). For example, a guard interval may reduce ISI caused by channel spread (i.e., some frequency ranges of a signal may reach a receiver after a delay caused by multipath signal propagation). A wireless device (either the transmitter or the receiver) may also use the guard interval period to perform finite impulse response (FIR) filtering on a signal. In some cases, the guard interval may be longer than the sum of the channel spread, FIR filter period and other useful delay periods. This may result in excess unused transmission time overhead.

SUMMARY

The present disclosure relates generally to wireless communication systems, and more particularly to improved systems, methods, and/or apparatuses for delay spread estimation and utilization. A wireless communication device may receive a data frame and use it to estimate a residual channel length (RCL). The device may then modify a finite impulse response (FIR) filter based on the estimated RCL. For example, the device may add additional taps to the FIR filter. The device may continue to adjust the FIR filter until the RCL is at or near zero. In some cases, the wireless communication device may send an indication to the transmitting device to adjust an FIR filter based on the estimated RCL. In some cases, the length of a guard interval may also be adjusted based on the estimated RCL.

A method of delay spread estimation and utilization is described. The method may include receiving a data frame over a channel, estimating an RCL for the channel based at least in part on the received data frame, and modifying an FIR filter based at least in part on the estimated RCL.

An apparatus for delay spread estimation and utilization is described. The apparatus may include means for receiving a data frame over a channel, means for estimating an RCL for the channel based at least in part on the received data frame, and means for modifying an FIR filter based at least in part on the estimated RCL.

An apparatus for delay spread estimation and utilization is described. The apparatus may include a processor, memory in electronic communication with the processor, and instructions stored in the memory, wherein the instructions are executable by the processor to receive a data frame over a channel, estimate an RCL for the channel based at least in part on the received data frame, and modify an FIR filter based at least in part on the estimated RCL.

A non-transitory computer-readable medium storing code for delay spread estimation and utilization is also described. The code may include instructions executable by a processor to receive a data frame over a channel, estimate an RCL for the channel based at least in part on the received data frame, and modify an FIR filter based at least in part on the estimated RCL.

In some examples of the method, apparatuses, and/or non-transitory computer-readable medium described above modifying the FIR filter comprises adding a number of additional taps to the FIR filter. In some examples the number of additional taps added to the FIR filter causes a subsequent estimated RCL to be a non-negative value.

In some examples of the method, apparatuses, and/or non-transitory computer-readable medium described above the estimated RCL is a non-negative value, and the modifying the FIR filter is based at least in part on the estimated RCL being a non-negative value. In some examples the FIR filter is a receive FIR filter.

In some examples of the method, apparatuses, and/or non-transitory computer-readable medium described above modifying the FIR filter comprises adapting a number of taps for the FIR filter for a next frame following the data frame. In some examples modifying the FIR filter comprises adapting a number of taps for the FIR filter based on a set of received frames comprising the data frame.

In some examples of the method, apparatuses, and/or non-transitory computer-readable medium described above may further include performing a post-coding operation on a computed H matrix. In some examples the post coding operation is performed for the data frame.

In some examples of the method, apparatuses, and/or non-transitory computer-readable medium described above the modified FIR filter is associated with a tighter channel selectivity. In some examples, the FIR filter is a receiver FIR filer.

In some examples of the method, apparatuses, and/or non-transitory computer-readable medium described above the FIR filter is a transmit FIR filter. In some examples a modified FIR filter is associated with a tight spectral mask, wherein the tight spectral mask is tighter than an unmodified spectral mask. In some examples modifying the FIR filter comprises sending an indication to a peer device to add more taps to the transmit FIR filter, wherein the peer device has transmitted the data frame.

In some examples of the method, apparatuses, and/or non-transitory computer-readable medium described above may further include sending an indication to the peer device to adjust a GI for a subsequent data frame.

In some examples of the method, apparatuses, and/or non-transitory computer-readable medium described above may further include determining that the estimated RCL is greater than a threshold. Some examples may include increasing an output power based at least in part on the determination that the estimated RCL is greater than the threshold. Some examples may include reducing an output power based at least in part on the determination that the estimated RCL is greater than the threshold. Some examples may include degrading a radio frequency (RF) parameter based at least in part on the determination that the estimated RCL is greater than the threshold, wherein the RF parameter is associated with a transmit error vector magnitude (EVM) to reduce power consumption.

In some examples of the method, apparatuses, and/or non-transitory computer-readable medium described above may further include determining a channel impulse response, wherein the estimated RCL is based at least in part on the determined channel impulse response. Some examples may include adjusting a GI based at least in part on the RCL.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The described features generally relate to improved systems, methods, and/or apparatuses for delay spread estimation and utilization. A wireless communication device may receive a data frame and use it to estimate a residual channel length (RCL). The device may then modify a finite impulse response (FIR) filter based on the estimated RCL. For example, the device may add additional taps to the FIR filter. The device may continue to adjust the FIR filter until the RCL is at or near zero. In some cases, the wireless communication device may send an indication to the transmitting device to adjust an FIR filter based on the estimated RCL. In some cases, the length of a guard interval may also be adjusted based on the estimated RCL.

If the length of the guard interval exceeds the sum time for the channel delay, the FIR filter periods, and other useful delays, the wireless transmissions may have an excess in transmission time overhead. Thus, in some cases, the length of the guard interval may be reduced. In other cases, a wireless device may increase the time used for FIR filtering. Increasing the time used for FIR filtering based on an RCL may result in improved channel selectivity or a tighter spectral mask. This may result in improved signal quality for the end users. Thus, the described features may improve rate adaptation and channel selectivity filters using knowledge of delay spread. The described features may be used in an open loop or a closed loop mode of operation.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
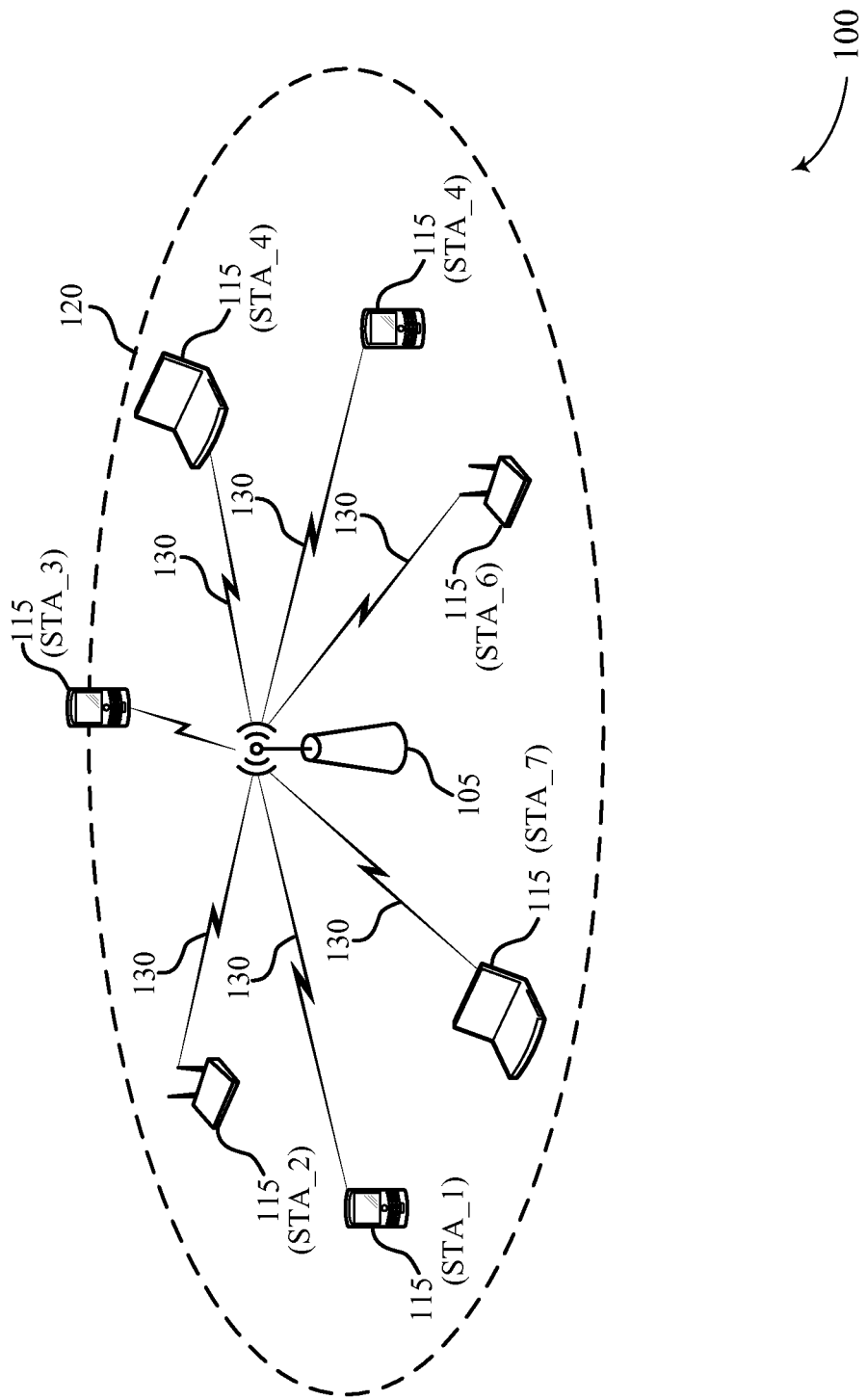
FIG. 1 illustrates an example of a wireless communications system in accordance with various aspects of the present disclosure.

FIG. 1 illustrates a wireless local area network (WLAN) 100 (also known as a wireless fidelity (Wi-Fi) network) configured in accordance with various aspects of the present disclosure. The WLAN 100 includes an access point (AP) 105 and multiple associated stations 115. In this example, there are shown seven (7) stations 115, which are identified as station (STA)_1, STA_2, STA_3, STA_4, STA_5, STA_6, and STA_7. The WLAN 100, however, may have more or fewer stations 115 than those shown in FIG. 1 since the number shown is simply for illustrative purposes. The AP 105 and the associated stations 115 may represent a basic service set (BSS) or an extended service set (ESS). The various stations 115 in the network are able to communicate with one another through the AP 105. Also shown is a coverage area 120 of the AP 105, which may represent a basic service area (BSA) of the WLAN 100. Although not shown in FIG. 1, an extended network base station associated with the WLAN 100 can be typically connected to a wired or wireless distribution system (DS) that may allow multiple APs 105 to be connected in an ESS.

The AP 105 may communicate bi-directionally with each of the stations 115 using transmissions 130. The transmissions 130 may include downlink transmissions, e.g., beacon frames, that are sent from the AP 105 to a station 115 as well as uplink transmissions, e.g., acknowledgement (ACK) frames, that are sent from a station 115 to the AP 105. Typically, the AP 105 broadcasts its downlink transmissions to the stations 115 that are within the coverage area 120. In some cases, uplink (UL) or downlink (DL) transmissions in WLAN 100 may be subject to multipath propagation or other forms of channel spread. Thus, to protect against inter-symbol interference, AP 105 and STAs 115 may utilize a guard interval (GI). In addition to separating signals in the time domain, the GI may also be used by the devices to filter UL or DL signals, e.g., using an FIR filter.

According to the present disclosure, a wireless communication device (e.g., a STA 115 or AP 105) may receive a data frame from another device, estimate an RCL (i.e., excess GI time period), and modify an FIR filter (e.g., by adding additional taps to the FIR filter). The device may continue to adjust the FIR filter until the RCL is at or near zero.

Figure 2:
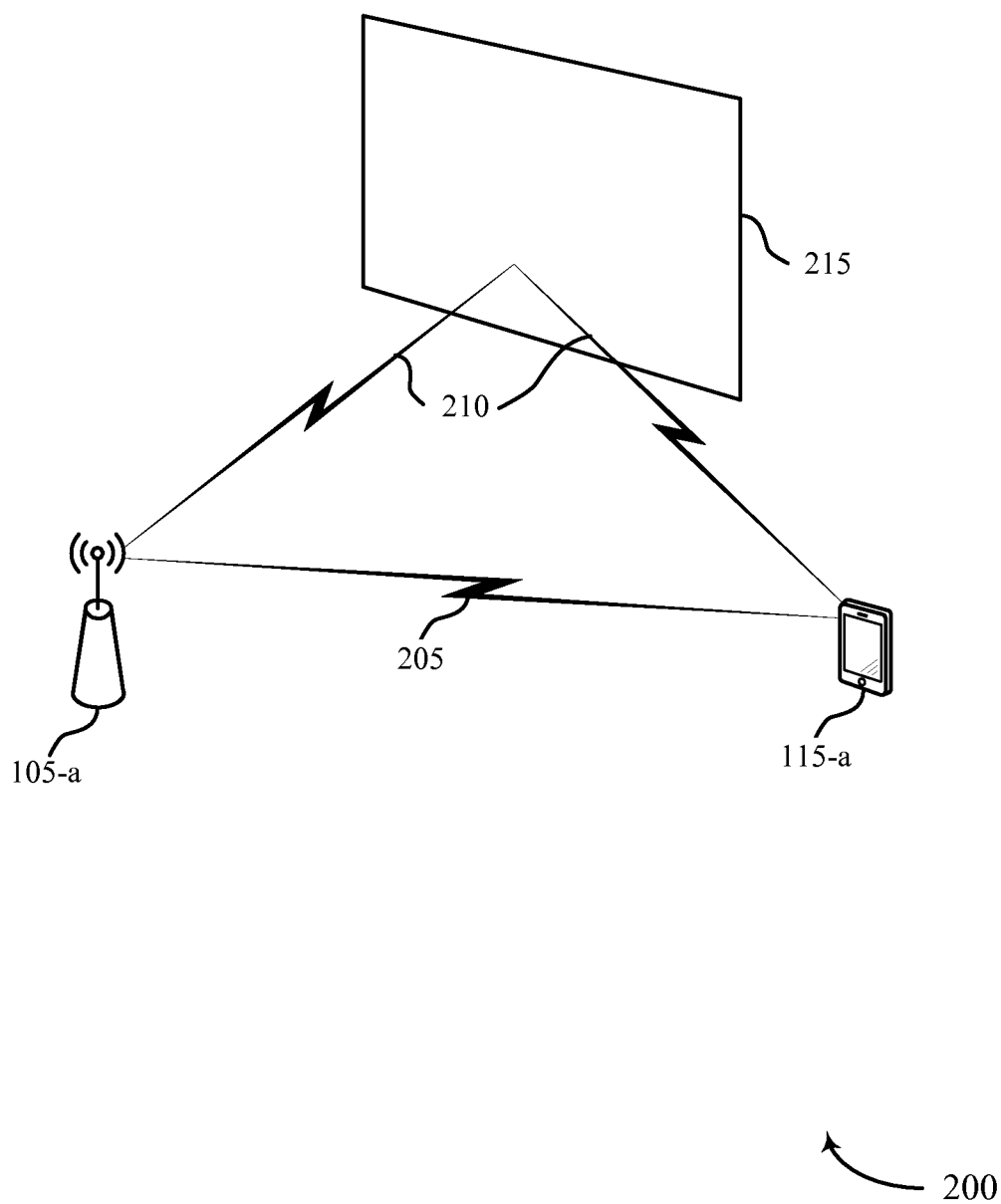
FIG. 2 illustrates an example of a wireless communications system with multipath propagation in accordance with various aspects of the present disclosure.

FIG. 2 illustrates an example of a wireless communication system 200 with multipath propagation in accordance with various aspects of the present disclosure. Wireless communication system 200 may include an AP 105-a in communication with a STA 115-a over a communication link 205 subject to multipath propagation (and, as a result, channel spread).

Multipath propagation may be caused by different copies of a wireless signal reaching a receiver via different paths with varying path lengths. Wireless communication system 200 illustrates a direct path 205 from AP 105-a to STA 115-a and an indirect path 210. The different path lengths may be based on, for example, atmospheric reflection and refraction, and reflection from buildings, water, or other surfaces. Wireless communication system 200 illustrates a physical object 215 causing reflection that results in indirect path 210. The effects of multipath propagation may include phase shifting of the signal as well as constructive and destructive interference (e.g., inter-symbol interference (ISI)).

A GI may be prepended to transmissions to mitigate the effects of channel spreading, and to allow AP 105-a and STA 115-a to perform signal filtering and other signal processing (e.g., digital pre-distortion (DPD) or windowing). However, in some cases, the GI may be longer than the sum of the channel delay and the processing periods. Excess GI time may be known as the RCL. According to the present disclosure, each wireless device (e.g., STA 115-a and AP 105-a) may receive a data frame from the other device, estimate an RCL, and modify an FIR filter (e.g., by adding additional taps to the FIR filter or by indicating to the other device to add taps to an FIR filter). The devices may continue to adjust the transmit and receive FIR filters until the RCL is at or near zero.

Figure 3A:
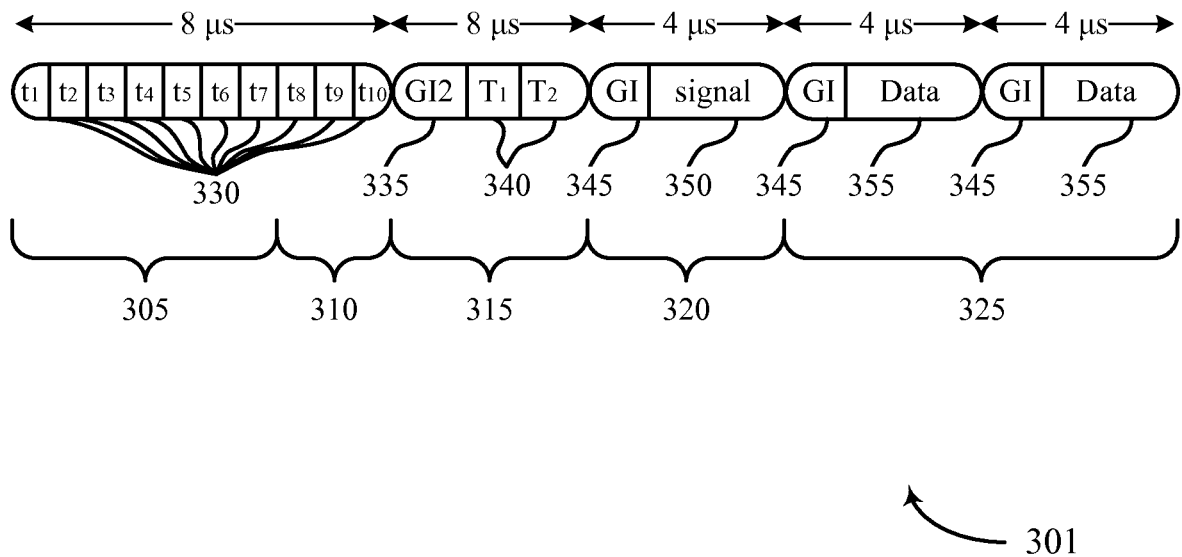
FIG. 3A illustrates an example set of wireless transmissions for delay spread estimation and utilization in accordance with various aspects of the present disclosure.

FIG. 3A illustrates an example set of wireless transmissions 301 for delay spread estimation and utilization in accordance with various aspects of the present disclosure. The set of wireless transmissions 301 may include a first short training interval 305, a second short training interval 310, a channel offset estimation interval 315, a rate length interval 320, and a data interval 325.

The first short training interval 305 may include multiple short training transmissions 330, and may be used for signal detection, automatic gain control (AGC), diversity selection, and for other purposes. The second short training interval 310 may include multiple short training transmissions 330, and may be used for coarse frequency offset estimation and timing synchronization. In some examples, the total short training interval time period including first short training interval 305 and second short training interval 310 may be 8 μs in length.

The channel offset estimation interval 315 may include a double guard interval (GI2) 335 and multiple long training intervals 340, and may be used for fine channel and frequency offset estimation. Rate length interval 320 may include a short guard interval (GI) and a rate length signal, and may be used for signaling the symbol length for subsequent data symbols. Data interval 325 may include multiple data symbols, each of which may include a GI 345 and data sequence 355.

In some cases, such as in orthogonal frequency division multiplexing (OFDM) based Institute of Electrical and Electronics Engineers (IEEE) 802.11 standards, one of several GI periods may be used (e.g., to add a cyclic prefix to each OFDM Symbol). For example, a GI of 0 μs (no GI) used in a legacy short training field (L-STF) which may correspond to as the first short training interval 305 and the second short training interval 310. A short guard interval (SGI) may be 0.4 μs in length and may be used selectively with data symbols in, e.g., IEEE 802.11n/ac technologies. A long guard interval (LGI) may be 0.8 μs in length and may be used with data symbols and physical layer convergence protocol (PLCP) signal fields (e.g., rate length interval 320, and data interval 325). A double guard interval (GI2) may be 1.6 μs in length and may be used with a legacy long training field (L-LTF) which may correspond to channel offset estimation interval 315.

The GI may serve to protect against ISI in OFDM by covering for multipath channel spread, transmit and receive channel selectivity filter delays (e.g., for an FIR filter or an infinite impulse response IIR filter), and other delays such as digital pre-distortion or windowing delays. In some cases, a GI may be selected such that the sum of the channel spread and the signal processing delays is less than the GI length. In some cases, a GI may be selected based on a packet error rate (PER), received signal strength indication, or a combination thereof. For example, SGI may be selected when PER, computed macroscopically from acknowledgement statistics, is below a threshold and when the modulation and coding scheme (MCS) corresponds to a high data rate.

In some cases, a first device (e.g., a STA 115 or AP 105) may select a first GI period for transmissions and another device in communication with the first device may select a second, different, GI period for transmissions. In some cases, selecting an SGI may result in approximately 10% throughput improvement compared to LGI.

Thus, according to the present disclosure, a wireless communication device may receive a data frame, estimate an RCL based on the GI and signal processing delays, and modify an FIR filter (e.g., by adding additional taps to the FIR filter).

Figure 3B:
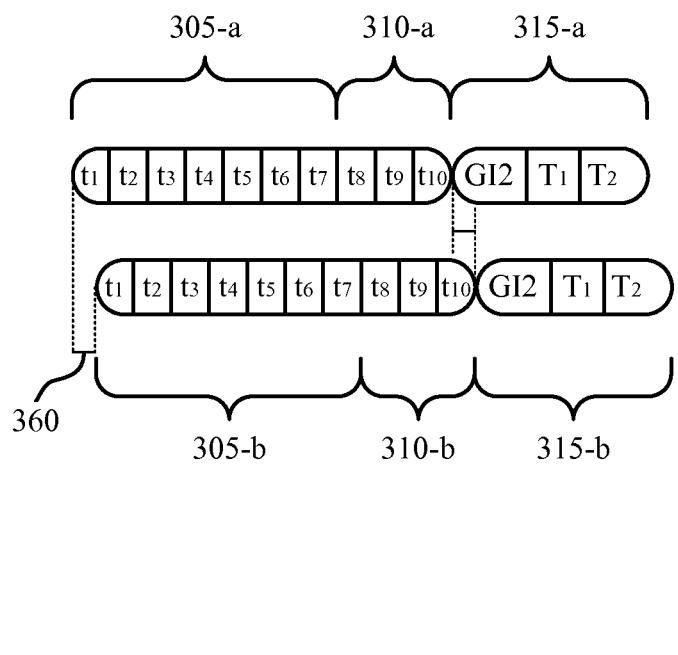
FIG. 3B illustrates an example set of wireless transmissions for delay spread estimation and utilization in accordance with various aspects of the present disclosure.

FIG. 3B illustrates an example set of wireless transmissions 302 for delay spread estimation and utilization in accordance with various aspects of the present disclosure. The set of wireless transmissions 302 may include two different copies of a set of transmissions received by a wireless communication device, such that one copy is received after a delay 360 caused by multipath propagation. For example, first short training interval 305-a, second short training interval 310-a, and channel offset estimation interval 315-a may represent the same transmissions as first short training interval 305-b, second short training interval 310-b, and channel offset estimation interval 315-b received after delay 360.

In some cases, an RCL may be obtained using a channel offset estimation interval 315 as described above with reference to FIG. 3A (i.e., comparing channel offset estimation interval 315-a and channel offset estimation interval 315-b). This sequence may be known a priori, and may have auto-correlation properties that may make precise measurements of channel delay possible. For example, precise RCL may be obtained by self-correlating the first 32 samples with the last 32 samples of a 160 sample channel offset estimation interval 315. In some cases, an L-STF self-correlation may be used to determine the coarse timing, which may help identify the beginning of the cyclic prefix of a channel offset estimation interval 315.

Calculation of the precise RCL may reflect multipath delays, transmit FIR filters for spectrum adherence, receive FIR filters for channel selectivity, transmit DPD-induced delays, heavy clip delays, and other delays. In various examples, RCL may be computed from a data symbol by correlating the trailing and starting samples of the symbol. For example, by computing the Channel Frequency Response (CFR, a.k.a. 'H') and taking the inverse fast Fourier transform (IFFT), obtaining a channel impulse response (CIR), and then computing the channel delay spread from the number of significant rays above a noise threshold Thus, a wireless communication device may receive a data frame, estimate an RCL, and modify a FIR filter (e.g., by adding additional taps to the FIR filter). The device may continue to adjust the FIR filter until the RCL is at or near zero.

Figure 4:
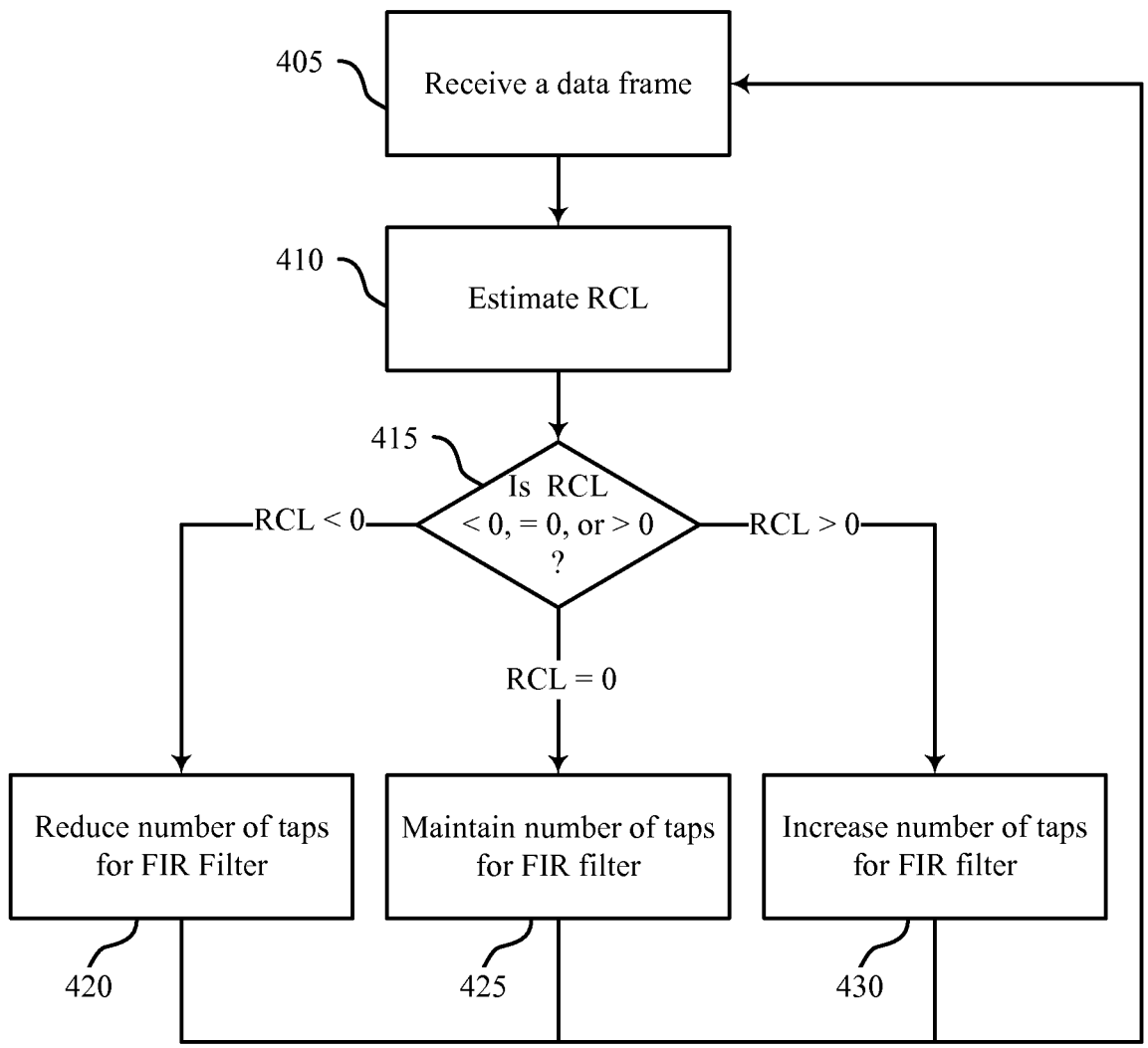
FIG. 4 shows a flowchart illustrating a method for delay spread estimation and utilization in accordance with various aspects of the present disclosure.

FIG. 4 shows a flowchart 400 illustrating a method for delay spread estimation and utilization in accordance with various aspects of the present disclosure. The operations of flowchart 400 may be carried out by a wireless communication device, which in some examples may be an example of an AP 105 or a station 115 as described above with reference to FIGS. 1-2. Flowchart 400 may also incorporate wireless transmissions with GI and RCL as described above with reference to FIGS. 3A and 3B.

At block 405, the wireless communication device may receive a data frame over a channel. At block 410, the wireless communication device may estimate an RCL for the channel based on the received data frame. For example, a wireless communication device may perform self-correlation using samples from a first short training interval 305, a second short training interval 310, a channel offset estimation interval 315, a rate length interval 320, or a data interval 325 as described above with reference to FIGS. 3A and 3B.

At block 415, the wireless communication device may determine whether the RCL is less than, equal to, or greater than zero. At block 420, if the RCL is less than zero, the wireless communication device may reduce the number of taps for an FIR filter. At block 420, if the RCL is equal (or approximately equal) to zero, the wireless communication device may increase the number of taps for an FIR filter. At block 420, if the RCL is greater than zero, the wireless communication device may reduce the number of taps for an FIR filter. In some examples, the wireless communication device may reduce, maintain, or increase a time period for a filter other than a FIR filter (e.g., an IIR filter) or another signal processing operation instead of adding taps to an FIR filter. In some cases, the wireless communication device may adjust a GI instead of, or in conjunction with modifying the FIR filter (e.g., the wireless communication device may reduce the GI and/or increase a number of taps for the FIR filter when the RCL is greater than zero).

Thus, the wireless communication device may modify a finite impulse response (FIR) filter based on the estimated RCL. In some examples the FIR filter may be a receive FIR filter. A digital receive FIR filter may be used after an analog filter to improve channel selectivity and may mitigate adjacent channel interference (ACI). These delay-tap receive FIR filters may utilize the channel length and the number of taps may be factored into the overall choice of the GI period. That is, a higher number of taps may result in better channel selectivity, but it may further encroach into the channel length.

Calculating RCL may provide a number of additional taps that may be added to the receive FIR without significantly increasing ISI. This may improve ACI performance in clean channel conditions and provide a dynamic performance metric in a varying wireless channel. In one example, a device may receive a first packet with nominal receive FIR taps, estimate RCL, and decide to use additional receive FIR taps (resulting in a tighter receive FIR) for the next packet by pre-configuring the receive FIRs.

If the device receives the next packet (using the tighter receive FIR) and continues to find the RCL is still non-negative (i.e., no ISI), the device may then increase the number of FIR taps and repeat the process. In some cases, the device receives the next packet (using the tighter receive FIR) and determines the RCL is negative (i.e., it incurred ISI, possibly resulting in bit errors that may be corrected by additional (Viterbi) coding gain or irreversibly lost). The device may then reduce the number of taps (e.g., fall back to nominal receive FIR taps).

In another example, the device may receive a packet with nominal receive FIR taps, determines RCL and then decides to use improved receive FIR taps from the same packet (i.e., using in-packet/per-packet adaptation). That is, the receiver may perform a post-coding operation on the already computed CFR/H matrix to eliminate the effect of the nominal receive FIR and add in the effects of the tighter receive FIR. In some cases, the post-coding operation may involve multiplying a frequency domain inverse to the original H matrix: $H_{nominal\_fir}^{-1} \cdot H_{tighter\_fir}$. In some examples, the post-coded CFR matrix H can be used directly for equalizing the rest of the data symbols in the frame.

In yet another example, the receive FIR may be immediately reconfigured with the additional taps as part of the receive processing, e.g., in an architecture where enough memory is in baseband to hold the analog-to-digital conversion (ADC) samples until a selection of receive FIR is made. In another example, the receiver may operate in multiple paths with varied receive FIR taps and the highest taps configuration that ensures the lowest non-negative RCL may be selected as the path for receiving the rest of the data symbol after the determination is made.

In some examples the FIR filter may be a transmit FIR filter. In some examples the modified FIR filter may be associated with a tight spectral mask, wherein the tight spectral mask may be tighter than an unmodified spectral mask. For example, the device may use RCL knowledge and channel reciprocity to modify a transmit FIR for a tighter spectral mask (i.e., more taps) so as to utilize the RCL (ensuring RCL is greater or equal to 0). In another example, the device may use an explicit indication (feedback) for another to add more taps to the other device's transmit FIR to help it improve the other device's spectral mask.

In one example the feedback may be a quantified number of additional taps that can be added such that the RCL will remain greater than or equal to zero. In another example, the feedback may be sent continuously at channel spread sampling intervals. In another example, the feedback may be sent via new action frames or by overloading bits in a block-acknowledgement frame.

The wireless communication device may increase an output power based on the determination that the RCL may be greater than a threshold. For example, the presence of a tighter filter mask may be utilized by the transmitter (remote or local end) to increase transmit power to improve link performance, without resulting in spectral leakage (i.e., exceeding the spectral mask boundaries). This may help when operating in band-edges where spectral leakage is a consideration, which may force transmitters to back off power more than the device would otherwise.

The wireless communication device may increase an output power based on the determination that the RCL may be greater than a threshold. This may enable a device to save power (and degrade an EVM) with minimal performance impact.

In one example, transmit spectral tightening can be utilized by an AP 105 operating in a single user (SU) transmit mode. In another example, the AP 105 may receive an RCL input (in units of additional taps or in units of sampling interval samples) from multiple user (MU) DL STAs 115 and the AP 105 may decide to add the smallest of the RCL values reported by the STAs 115 in the group so as not to cause ISI for any of them. The AP 105 may then add more taps to transmit FIR to improve spectral mask in the remaining free RCL.

Thus, in some examples modifying the FIR filter includes sending an indication to a peer device to add taps to the FIR filter, wherein the peer device has transmitted the data frame. For example, the wireless communication device may send an indication to the peer device to adjust a guard interval (GI) for a subsequent data frame.

The wireless communication device may also degrade a radio frequency (RF) parameter based on a determination that the estimated RCL is greater than a threshold. In some cases, the RF parameter may be associated with a transmit error vector magnitude (EVM).

The wireless communication device may also adjust a GI based on the RCL. For example, the device may utilize the RCL to determine how much of an LGI is un-altered from the original prefix. The device may then determine if the RCL is large enough to operate in a SGI mode. In one example, the device may utilize reciprocity of the channel and sends UL data using SGI as a fast way of controlling its local Rate Adaptation logic. For example, rapid utilization of SGI may provide an UL throughput gain of 10% compared to slower adapting logic.

In another example, the device may not assume channel reciprocity and may send a specific action frame to another device (e.g., a STA 115 may send an indication to an AP 105) requesting the other device to transmit frames enabled with SGI for improved DL throughput. This may constitute an explicit trigger mechanism for DL rate adaptation in the remote end. In another example, the device may overloads several unused acknowledgement bits to convey this message implicitly. In yet another example, the device may send an UL data frame with SGI enabled and a mutually cooperative AP 105 may assumes channel reciprocity and enables SGI in the immediate subsequent DL transmissions to the device.

In another example, the device may determines RCL from the LGI and advise, via explicit feedback frames, precise GI values to be chosen for DL transmission. In another example, the wireless system may operate using more than two GI values for data symbols and may chooses from a range of $\{GI_1 \ldots GI_n\}$ based on the feedback. In another example, the wireless system may operate using a finer continuum of cyclic prefix lengths in units of sampling interval samples.

Figure 5:
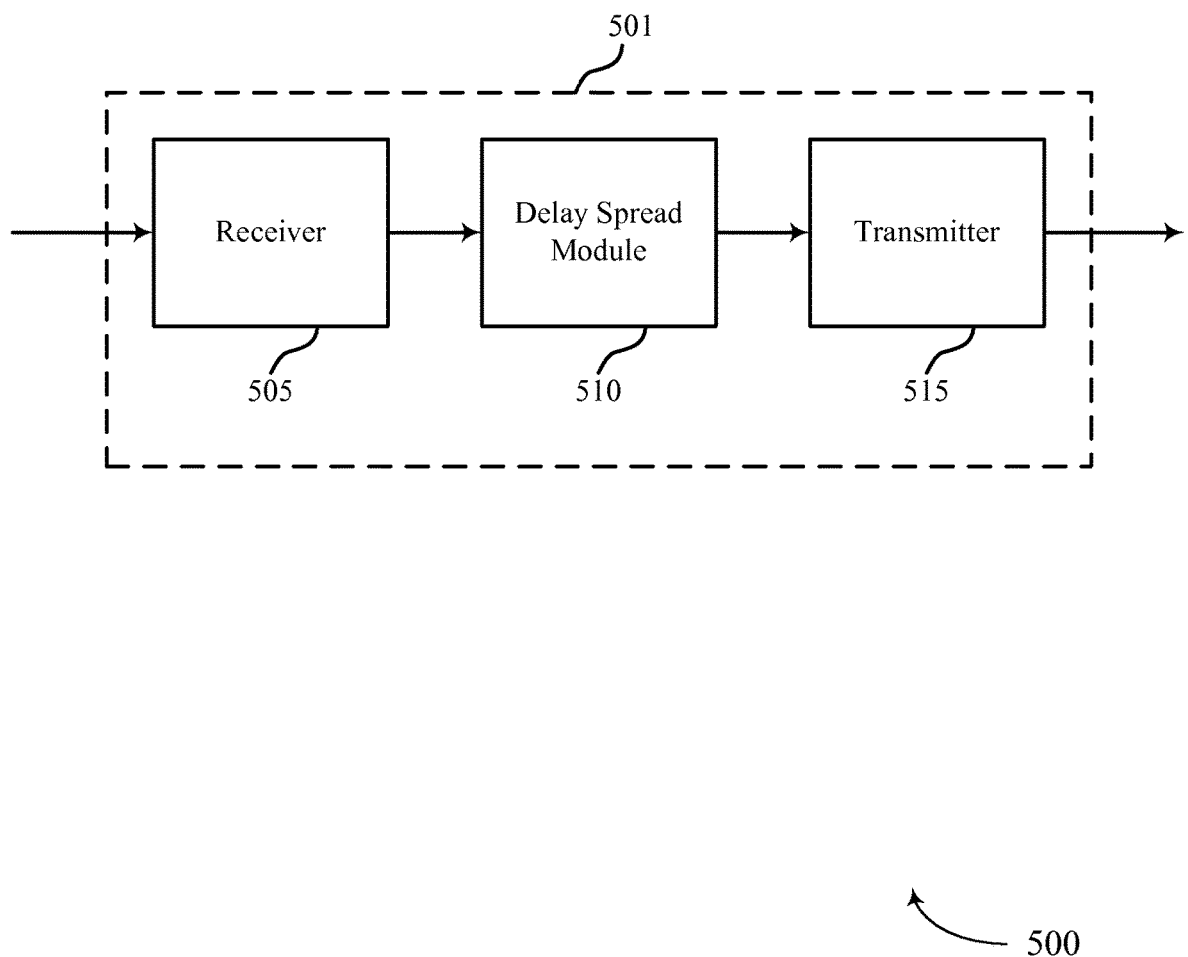
FIG. 5 shows a block diagram of a device for delay spread estimation and utilization in accordance with various aspects of the present disclosure.

FIG. 5 shows a block diagram 500 of a wireless communication device 501 for delay spread estimation and utilization in accordance with various aspects of the present disclosure. The wireless communication device 501 may be an example of one or more aspects of a wireless communication device described with reference to FIGS. 1-4. For example, the wireless communication device 501 may be an example of an AP 105 or a STA 115. The wireless communication device 501 may include a receiver 505, a delay spread module 510, and/or a transmitter 515. The wireless communication device 501 may also include a processor. Each of these components may be in communication with each other.

The components of the wireless communication device 501 may, individually or collectively, be implemented with at least one application specific integrated circuit (ASIC) adapted to perform some or all of the applicable functions in hardware. Alternatively, the functions may be performed by other processing units (or cores), on at least one IC. In other embodiments, other types of integrated circuits may be used (e.g., Structured/Platform ASICs, a field programmable gate array (FPGA), or another Semi-Custom IC), which may be programmed in any manner known in the art. The functions of each unit may also be implemented, in whole or in part, with instructions embodied in a memory, formatted to be executed by general or application-specific processors.

The receiver 505 may receive information such as packets, data frames, and/or control information associated with various information channels (e.g., control channels, data channels, etc.). Information may be passed on to the delay spread module 510, and to other components of the wireless communication device 501. In some examples, the receiver 505 may receive a data frame over a channel.

The delay spread module 510 may receive a data frame over a channel in coordination with receiver 505, to estimate an RCL for the channel based on the received data frame, and to modify an FIR filter based on the estimated RCL. In some examples, the delay spread module 510 may determine that the estimated RCL is greater than a threshold. In some examples, the delay spread module 510 may increase an output power based on the determination that the estimated RCL is greater than the threshold. In some examples, the delay spread module 510 may decrease an output power based on the determination that the estimated RCL is greater than the threshold. In some examples, the delay spread module 510 may degrade an RF parameter based on the determination that the estimated RCL is greater than the threshold, wherein the RF parameter is associated with a transmit EVM.

The transmitter 515 may transmit the signals received from other components of the wireless communication device 501. In some embodiments, the transmitter 515 may be collocated with the receiver 505 in a transceiver module. The transmitter 515 may include a single antenna, or it may include a plurality of antennas. In some examples, the transmitter 515 may send an indication to the peer device to modify a FIR filter or to adjust a GI.

Figure 6:
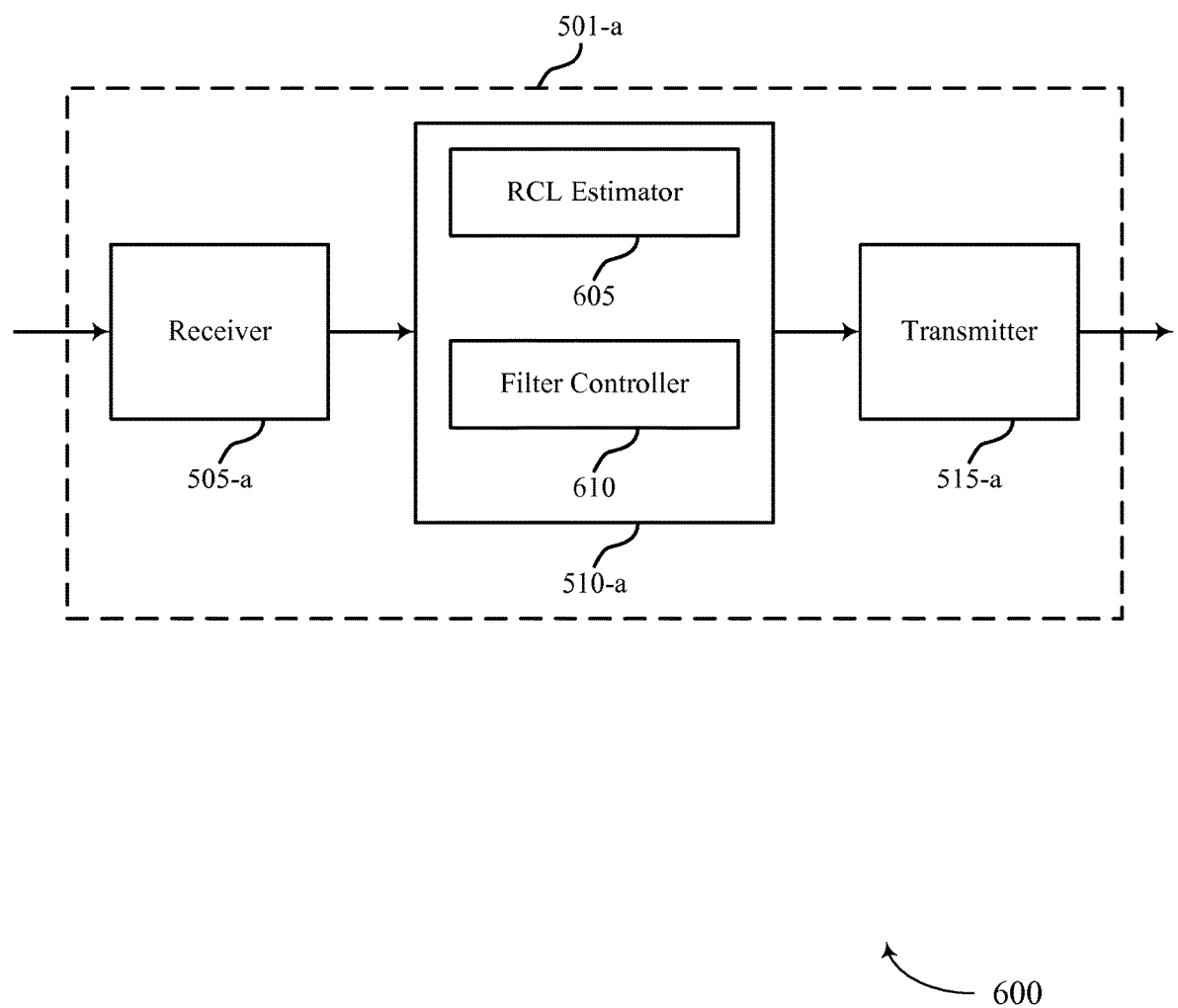
FIG. 6 shows a block diagram of a device for delay spread estimation and utilization in accordance with various aspects of the present disclosure.

FIG. 6 shows a block diagram 600 of a wireless communication device 501-a for delay spread estimation and utilization in accordance with various aspects of the present disclosure. The wireless communication device 501-a may be an example of one or more aspects of a wireless communication device described with reference to FIGS. 1-5. For example, the wireless communication device 501-a may be an example of a wireless communication device 501, which may be an example of an AP 105 or a STA 115. The wireless communication device 501-a may include a receiver 505-a, a delay spread module 510-a, and/or a transmitter 515-a. The wireless communication device 501-a may also include a processor. Each of these components may be in communication with each other. The delay spread module 510-a may also include a RCL estimator 605, and a filter controller 610.

The components of the wireless communication device 501-a may, individually or collectively, be implemented with at least one ASIC adapted to perform some or all of the applicable functions in hardware. Alternatively, the functions may be performed by other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by general or application-specific processors.

The receiver 505-a may receive information which may be passed on to the delay spread module 510-a, and to other components of the wireless communication device 501. The delay spread module 510-a may perform the operations described above with reference to FIG. 5. The transmitter 515-a may transmit the signals received from other components of the wireless communication device 501.

The RCL estimator 605 may estimate an RCL for the channel based on the received data frame as described above with reference to FIGS. 2-4. In some examples, the estimated RCL may be a non-negative value. In some examples, modifying an FIR filter may be based on the estimated RCL being a non-negative value.

The filter controller 610 may modify an FIR filter based on the estimated RCL as described above with reference to FIGS. 2-4. In some examples, the FIR filter may be a receive FIR filter. The receive FIR filter may be associated with a tighter channel selectivity. In some examples, the FIR filter may be a transmit FIR filter. The transmit FIR filter may be associated with a tight spectral mask, wherein the tight spectral mask may be tighter than an unmodified spectral mask. In some cases, filter controller 610 may control a filter other than an FIR filter, such as an IIR filter or another type of filter.

Figure 7:
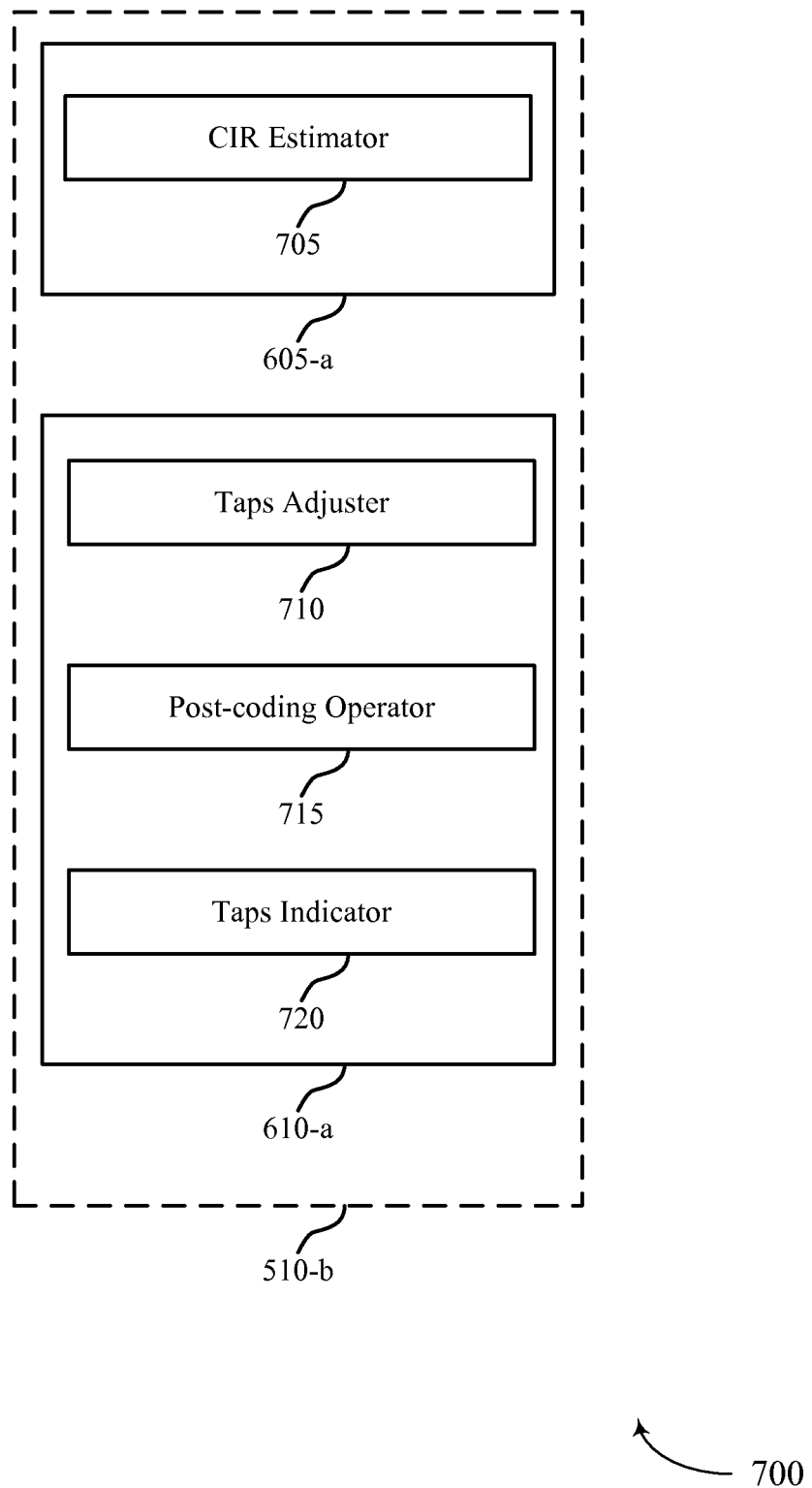
FIG. 7 shows a block diagram of a device for delay spread estimation and utilization in accordance with various aspects of the present disclosure.

FIG. 7 shows a block diagram 700 of a delay spread module 510-b for delay spread estimation and utilization in accordance with various aspects of the present disclosure. The delay spread module 510-b may be an example of aspects of a delay spread module 510 described with reference to FIGS. 5-7. The delay spread module 510-b may include a RCL estimator 605-a, and a filter controller 610-a. Each of these modules may perform the functions described above with reference to FIG. 7. The RCL estimator 605-a may include a CIR estimator 705. The filter controller 610-a may also include a taps adjuster 710, a post-coding operator 715, and a taps indicator 720.

The components of the delay spread module 510-b may, individually or collectively, be implemented with at least one ASIC adapted to perform some or all of the applicable functions in hardware. Alternatively, the functions may be performed by other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by general or application-specific processors.

The taps adjuster 710 may be implemented such that modifying the FIR filter may include adding a number of additional taps to the FIR filter as described above with reference to FIGS. 2-4. In some examples, the number of additional taps added to the FIR filter causes a subsequent estimated RCL to be a non-negative value. In some examples, modifying the FIR filter comprises adapting a number of taps for the FIR filter for a next frame following the data frame. In some examples, modifying the FIR filter comprises adapting a number of taps for the FIR filter based on a set of received frames comprising the data frame.

The post-coding operator 715 may perform a post-coding operation on a computed H matrix as described above with reference to FIGS. 2-4. For example, a post-coding operation may enable an FIR filter for a received data frame to be modified based on an estimated RCL of the same data frame.

The taps indicator 720 may be implemented such that modifying the FIR filter may include sending an indication to a peer device to add taps to the FIR filter, wherein the peer device has transmitted the data frame as described above with reference to FIGS. 2-4.

The CIR estimator 705 may determine a channel impulse response, wherein the estimated RCL is based on the determined channel impulse response as described above with reference to FIGS. 2-4.

Figure 8:
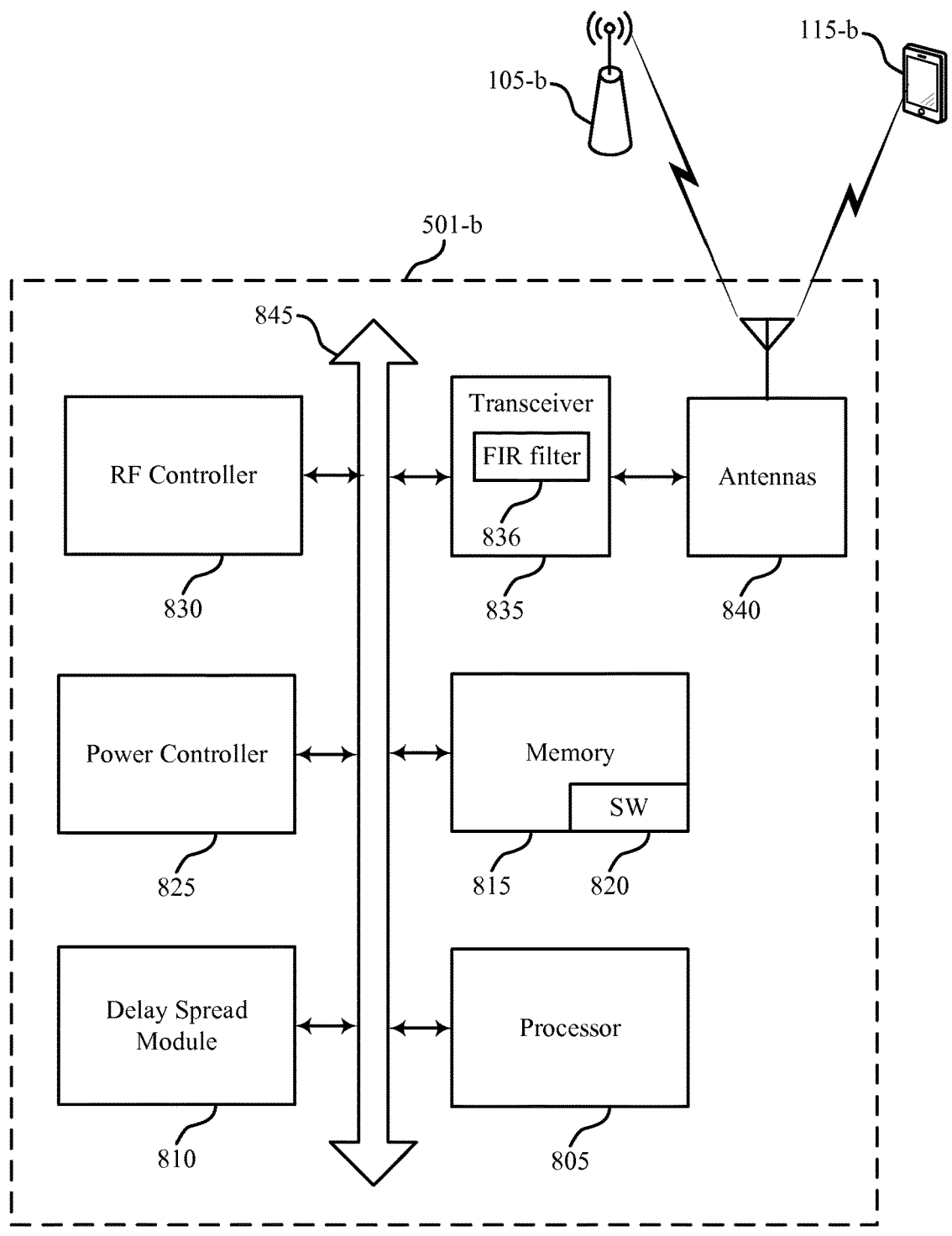
FIG. 8 illustrates a block diagram of a system for delay spread estimation and utilization in accordance with various aspects of the present disclosure.

FIG. 8 shows a diagram of a system 800 for delay spread estimation and utilization in accordance with various aspects of the present disclosure. System 800 may include a wireless communication device 501-b, which may be an example of a wireless communication device 501 described with reference to FIGS. 1-7. For example, wireless communication device 501-b may be an example of a wireless communication device 501, which may be an AP 105 or a STA 115. The wireless communication device 501-b may include a delay spread module 810, which may be an example of a delay spread module 510 described with reference to FIGS. 5-7. The wireless communication device 501-b may also include a power controller 825 and an RF controller 830. The wireless communication device 501-b may also include components for bi-directional voice and data communications including components for transmitting communications and components for receiving communications. For example, wireless communication device 501-b may be engaged in bi-directional communication with AP 105-b and/or STA 115-b.

Power controller 825 may select a transmit power for wireless communication device 501-*b*. For example, power controller 825 may adjust a transmit power based on an open loop or a closed loop power control algorithm. In some examples, wireless communication device 501-*b* may determine that an RCL is greater than a threshold, and power controller 825 may increase an output power based on the determination that the estimated RCL is greater than a threshold.

RF controller 830 may adjust RF processing parameters. In some examples, wireless communication device 501-*b* may determine that an RCL is greater than a threshold, and RF controller 830 may degrade an RF parameter based on the determination that the estimated RCL is greater than the threshold. In some examples, the RF parameter is associated with a transmit EVM.

The wireless communication device 501-*b* may also include a processor module 805, and memory 815 (including software (SW) 820), a transceiver module 835, and one or more antenna(s) 840, which each may communicate, directly or indirectly, with each other (e.g., via one or more buses 845). The transceiver module 835 may communicate bi-directionally, via the antenna(s) 840 and/or one or more wired or wireless links, with one or more networks, as described above. For example, the transceiver module 835 may communicate bi-directionally with a base station 105.

Transceiver module 835 may also contain a FIR filter 836. FIR filter 836 may be a filter whose impulse response settles to zero in a finite amount of time. FIR filter 836 may be used to filter a signal based on spectral properties. For example, FIR filter 836 may be a receive FIR filter for achieving channel selectivity. In another example, FIR filter 836 may be a receive FIR filter for satisfying a spectral mask.

The transceiver module 835 may include a modem to modulate the packets and provide the modulated packets to the antenna(s) 840 for transmission, and to demodulate packets received from the antenna(s) 840. While the wireless communication device 501-*b* may include a single antenna 840, the wireless communication device 501-*b* may also have multiple antennas 840 capable of concurrently transmitting and/or receiving multiple wireless transmissions. The transceiver module 835 may also be capable of concurrently communicating with one or more base stations 105.

The memory 815 may include random access memory (RAM) and read only memory (ROM). The memory 815 may store computer-readable, computer-executable software/firmware code 820 including instructions that, when executed, cause the processor module 805 to perform various functions described herein (e.g., delay spread estimation and utilization, etc.). Alternatively, the software/firmware code 820 may not be directly executable by the processor module 805 but may cause a computer (e.g., when compiled and executed) to perform functions described herein. The processor module 805 may include an intelligent hardware device, e.g., a central processing unit (CPU), a microcontroller, an ASIC, etc.

Figure 9:
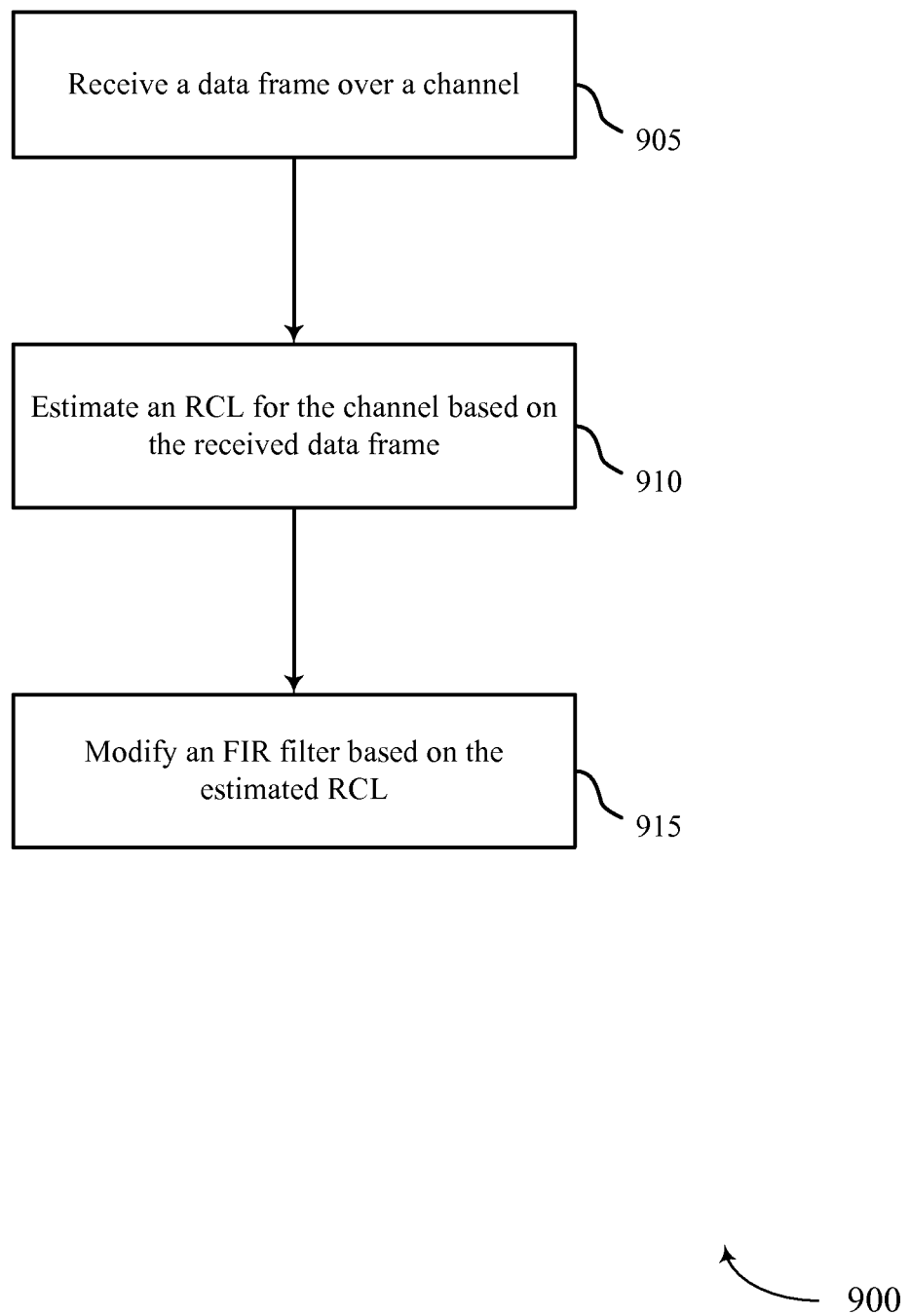
FIG. 9 shows a flowchart illustrating a method for delay spread estimation and utilization in accordance with various aspects of the present disclosure.

FIG. 9 shows a flowchart illustrating a method 900 for delay spread estimation and utilization in accordance with various aspects of the present disclosure. For clarity, the method 900 is described below with reference to aspects of one or more of the devices described with reference to FIGS. 1-8. The operations of method 900 may be implemented by a wireless communication device 501 or its components as described with reference to FIGS. 1-8. In certain examples, the operations of method 900 may be performed by the delay spread module as described with reference to FIGS. 5-8. In some examples, a wireless communication device may execute sets of codes to control the functional elements of the wireless communication device to perform the functions described below. Additionally or alternatively, the wireless communication device may perform the functions described below using special-purpose hardware.

At block 905, the wireless communication device may receive a data frame over a channel as described above with reference to FIGS. 2-4. In certain examples, the operation(s) of block 905 may be performed by the receiver 505 as described above with reference to FIG. 5.

At block 910, the wireless communication device may estimate an RCL for the channel based on the received data frame as described above with reference to FIGS. 2-4. In certain examples, the operation(s) of block 910 may be performed by the RCL estimator 605 as described above with reference to FIG. 6.

At block 915, the wireless communication device may modify an FIR filter based on the estimated RCL as described above with reference to FIGS. 2-4. In certain examples, the operation(s) of block 915 may be performed by the filter controller 610 as described above with reference to FIG. 6.

Figure 10:
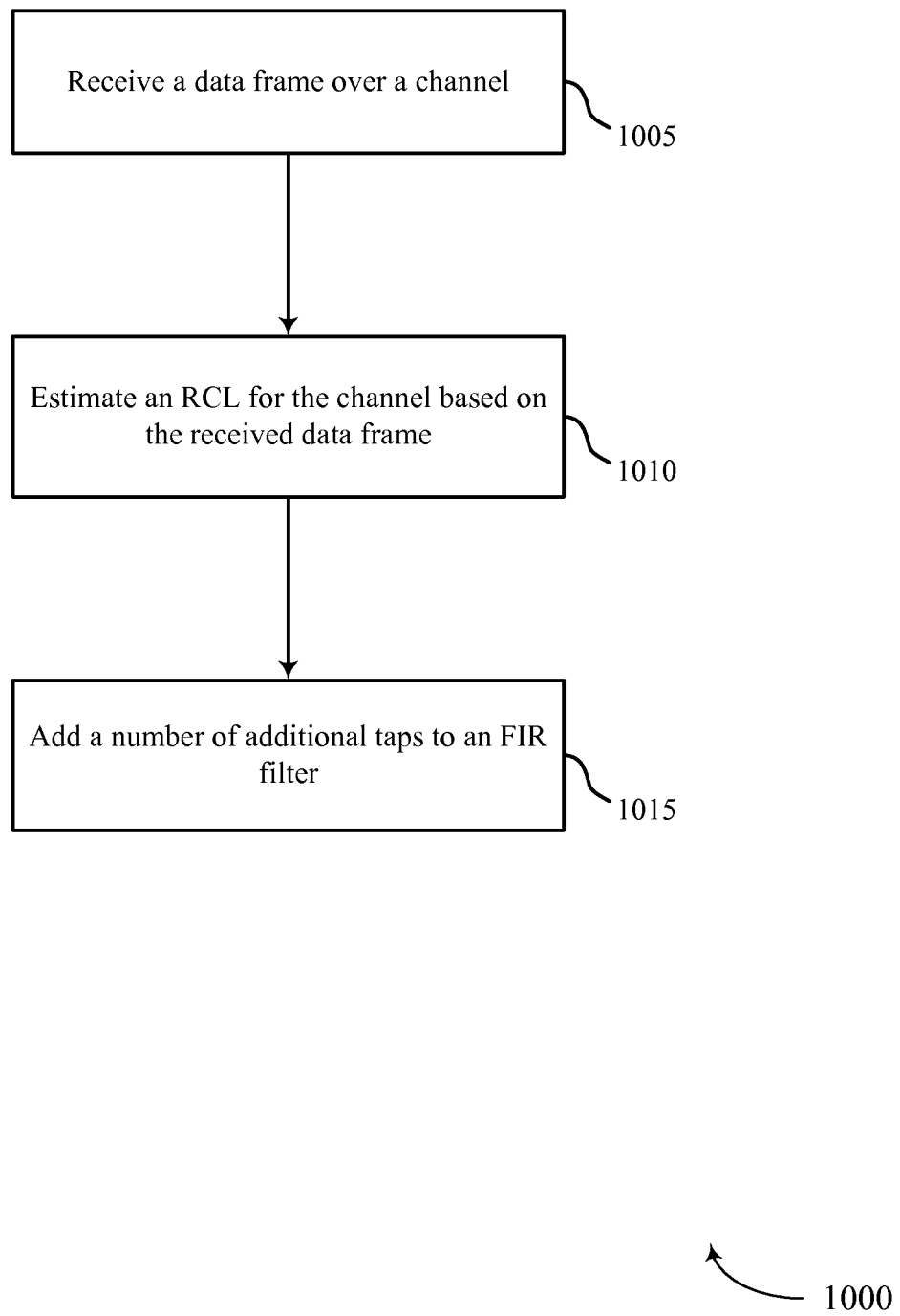
FIG. 10 shows a flowchart illustrating a method for delay spread estimation and utilization in accordance with various aspects of the present disclosure.

FIG. 10 shows a flowchart illustrating a method 1000 for delay spread estimation and utilization in accordance with various aspects of the present disclosure. For clarity, the method 1000 is described below with reference to aspects of one or more of the devices described with reference to FIGS. 1-8. The operations of method 1000 may be implemented by a wireless communication device 501 or its components as described with reference to FIGS. 1-8. In certain examples, the operations of method 1000 may be performed by the delay spread module as described with reference to FIGS. 5-8. In some examples, a wireless communication device may execute sets of codes to control the functional elements of the wireless communication device to perform the functions described below. Additionally or alternatively, the wireless communication device may perform the functions described below using special-purpose hardware. The method 1000 may also incorporate aspects of method 900 of FIG. 9.

At block 1005, the wireless communication device may receive a data frame over a channel as described above with reference to FIGS. 2-4. In certain examples, the operation(s) of block 1005 may be performed by the receiver 505 as described above with reference to FIG. 5.

At block 1010, the wireless communication device may estimate an RCL for the channel based on the received data frame as described above with reference to FIGS. 2-4. In certain examples, the operation(s) of block 1010 may be performed by the RCL estimator 605 as described above with reference to FIG. 6.

At block 1015, the wireless communication device may add a number of additional taps to the FIR filter as described above with reference to FIGS. 2-4. In certain examples, the operation(s) of block 1015 may be performed by the taps adjuster 710 as described above with reference to FIG. 7.

Figure 11:
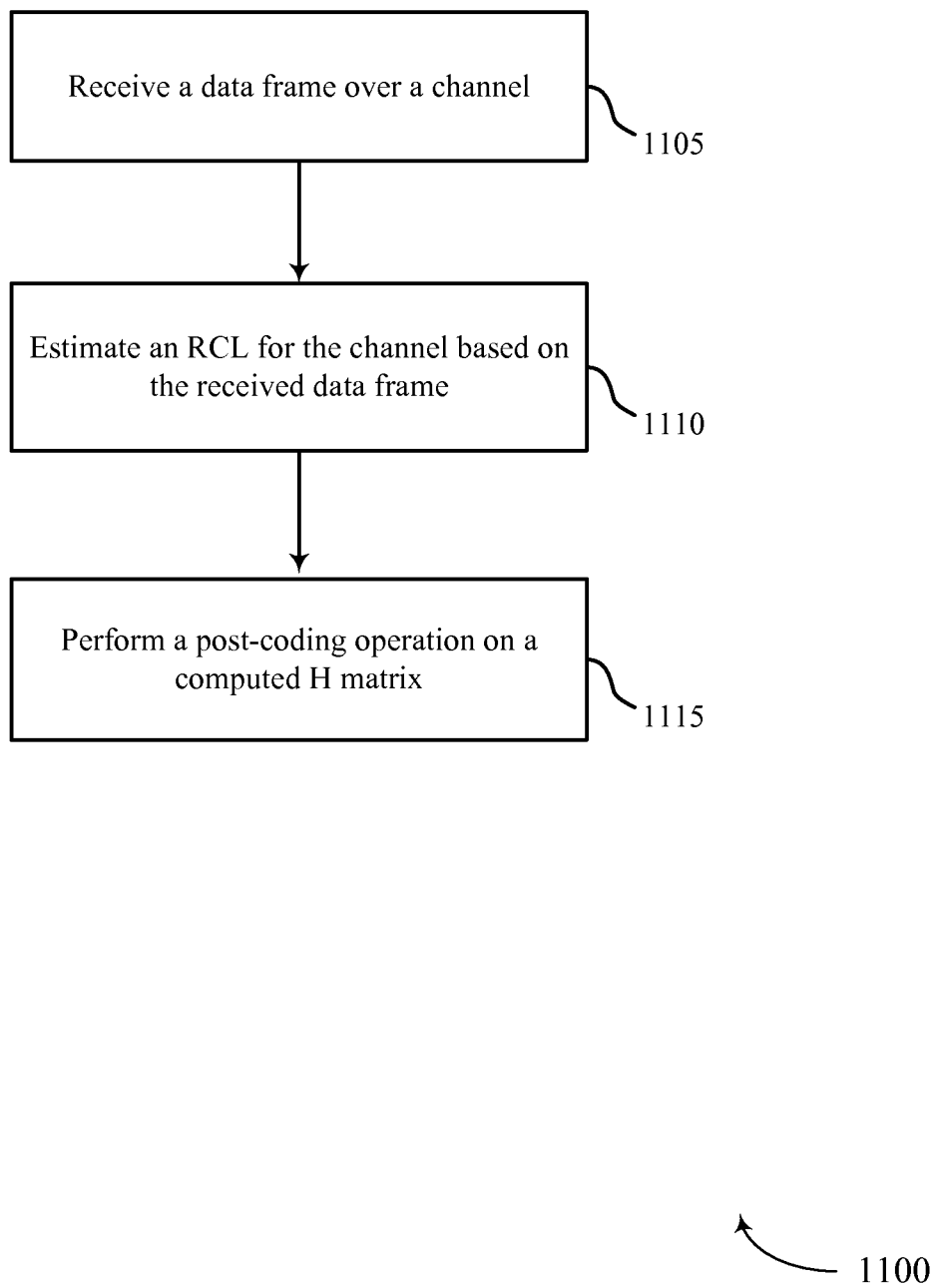
FIG. 11 shows a flowchart illustrating a method for delay spread estimation and utilization in accordance with various aspects of the present disclosure.

FIG. 11 shows a flowchart illustrating a method 1100 for delay spread estimation and utilization in accordance with various aspects of the present disclosure. For clarity, the method 1100 is described below with reference to aspects of one or more of the devices described with reference to FIGS. 1-8. The operations of method 1100 may be implemented by a wireless communication device 501 or its components as described with reference to FIGS. 1-8. In certain examples, the operations of method 1100 may be performed by the delay spread module as described with reference to FIGS.

5-8. In some examples, a wireless communication device may execute sets of codes to control the functional elements of the wireless communication device to perform the functions described below. Additionally or alternatively, the wireless communication device may perform the functions described below using special-purpose hardware. The method 1100 may also incorporate aspects of methods 900, and 1000 of FIGS. 9-10.

At block 1105, the wireless communication device may receive a data frame over a channel as described above with reference to FIGS. 2-4. In certain examples, the operation(s) of block 1105 may be performed by the receiver 505 as described above with reference to FIG. 5.

At block 1110, the wireless communication device may estimate an RCL for the channel based on the received data frame as described above with reference to FIGS. 2-4. In certain examples, the operation(s) of block 1110 may be performed by the RCL estimator 605 as described above with reference to FIG. 6.

At block 1115, the wireless communication device may perform a post-coding operation on a computed H matrix as described above with reference to FIGS. 2-4. For example, the wireless communication device may perform a post-coding operation in conjunction with modifying a receive FIR filter. In certain examples, the operation(s) of block 1115 may be performed by the post-coding operator 715 as described above with reference to FIG. 7.

Figure 12:
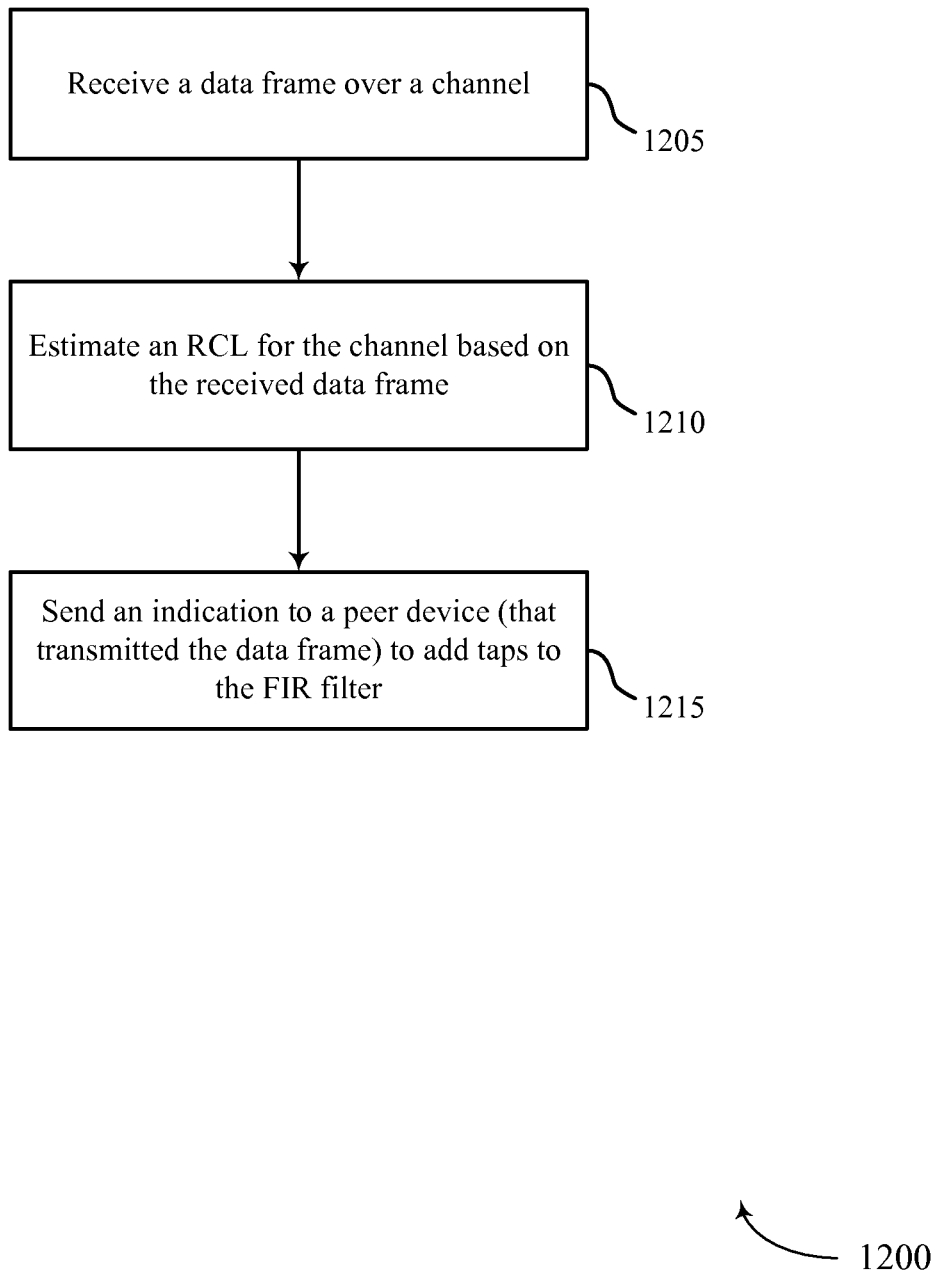
FIG. 12 shows a flowchart illustrating a method for delay spread estimation and utilization in accordance with various aspects of the present disclosure.

FIG. 12 shows a flowchart illustrating a method 1200 for delay spread estimation and utilization in accordance with various aspects of the present disclosure. For clarity, the method 1200 is described below with reference to aspects of one or more of the devices described with reference to FIGS. 1-8. The operations of method 1200 may be implemented by a wireless communication device 501 or its components as described with reference to FIGS. 1-8. In certain examples, the operations of method 1200 may be performed by the delay spread module as described with reference to FIGS. 5-8. In some examples, a wireless communication device may execute sets of codes to control the functional elements of the wireless communication device to perform the functions described below. Additionally or alternatively, the wireless communication device may perform the functions described below using special-purpose hardware. The method 1200 may also incorporate aspects of methods 900, 1000, and 1100 of FIGS. 9-11.

At block 1205, the wireless communication device may receive a data frame over a channel as described above with reference to FIGS. 2-4. In certain examples, the operation(s) of block 1205 may be performed by the receiver 505 as described above with reference to FIG. 5.

At block 1210, the wireless communication device may estimate an RCL for the channel based on the received data frame as described above with reference to FIGS. 2-4. In certain examples, the operation(s) of block 1210 may be performed by the RCL estimator 605 as described above with reference to FIG. 6.

At block 1220, the wireless communication device may send an indication to a peer device to add taps to the FIR filter, wherein the peer device has transmitted the data frame as described above with reference to FIGS. 2-4. In certain examples, the operation(s) of block 1220 may be performed by the taps indicator 720 as described above with reference to FIG. 7.

Figure 13:
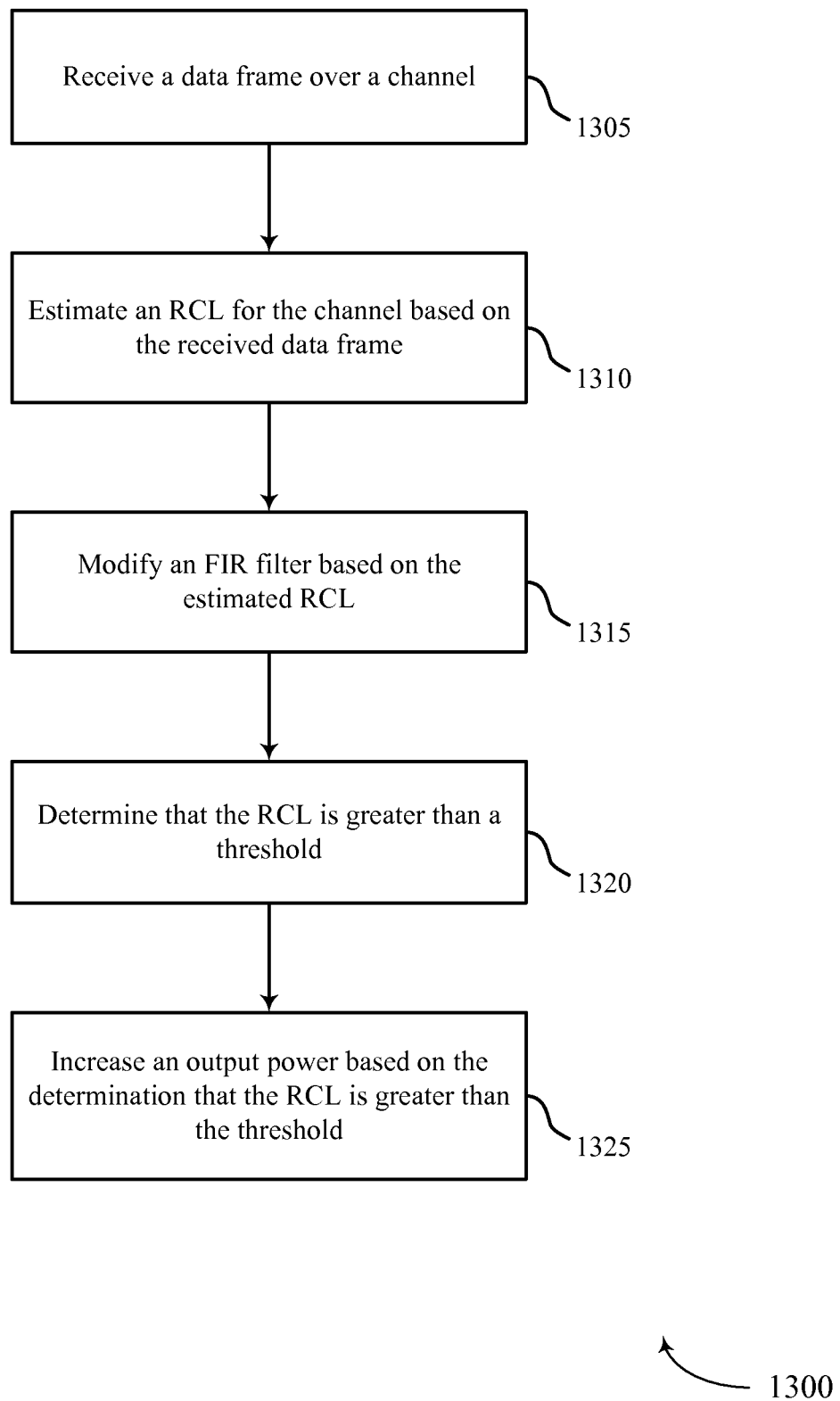
FIG. 13 shows a flowchart illustrating a method for delay spread estimation and utilization in accordance with various aspects of the present disclosure.

FIG. 13 shows a flowchart illustrating a method 1300 for delay spread estimation and utilization in accordance with various aspects of the present disclosure. For clarity, the method 1300 is described below with reference to aspects of one or more of the devices described with reference to FIGS. 1-8. The operations of method 1300 may be implemented by a wireless communication device 501 or its components as described with reference to FIGS. 1-8. In certain examples, the operations of method 1300 may be performed by the delay spread module as described with reference to FIGS. 5-8. In some examples, a wireless communication device may execute sets of codes to control the functional elements of the wireless communication device to perform the functions described below. Additionally or alternatively, the wireless communication device may perform the functions described below using special-purpose hardware. The method 1300 may also incorporate aspects of methods 900, 1000, 1100, and 1200 of FIGS. 9-12.

At block 1305, the wireless communication device may receive a data frame over a channel as described above with reference to FIGS. 2-4. In certain examples, the operation(s) of block 1305 may be performed by the receiver 505 as described above with reference to FIG. 5.

At block 1310, the wireless communication device may estimate an RCL for the channel based on the received data frame as described above with reference to FIGS. 2-4. In certain examples, the operation(s) of block 1310 may be performed by the RCL estimator 605 as described above with reference to FIG. 6.

At block 1315, the wireless communication device may modify an FIR filter based on the estimated RCL as described above with reference to FIGS. 2-4. In certain examples, the operation(s) of block 1315 may be performed by the filter controller 610 as described above with reference to FIG. 6.

At block 1320, the wireless communication device may determine that the estimated RCL is greater than a threshold as described above with reference to FIGS. 2-4. In certain examples, the operation(s) of block 1320 may be performed by the transmitter 515 as described above with reference to FIG. 5.

At block 1325, the wireless communication device may increase an output power based on the determination that the estimated RCL is greater than the threshold as described above with reference to FIGS. 2-4. In certain examples, the operation(s) of block 1325 may be performed by the transmitter 515 as described above with reference to FIG. 5.

Figure 14:
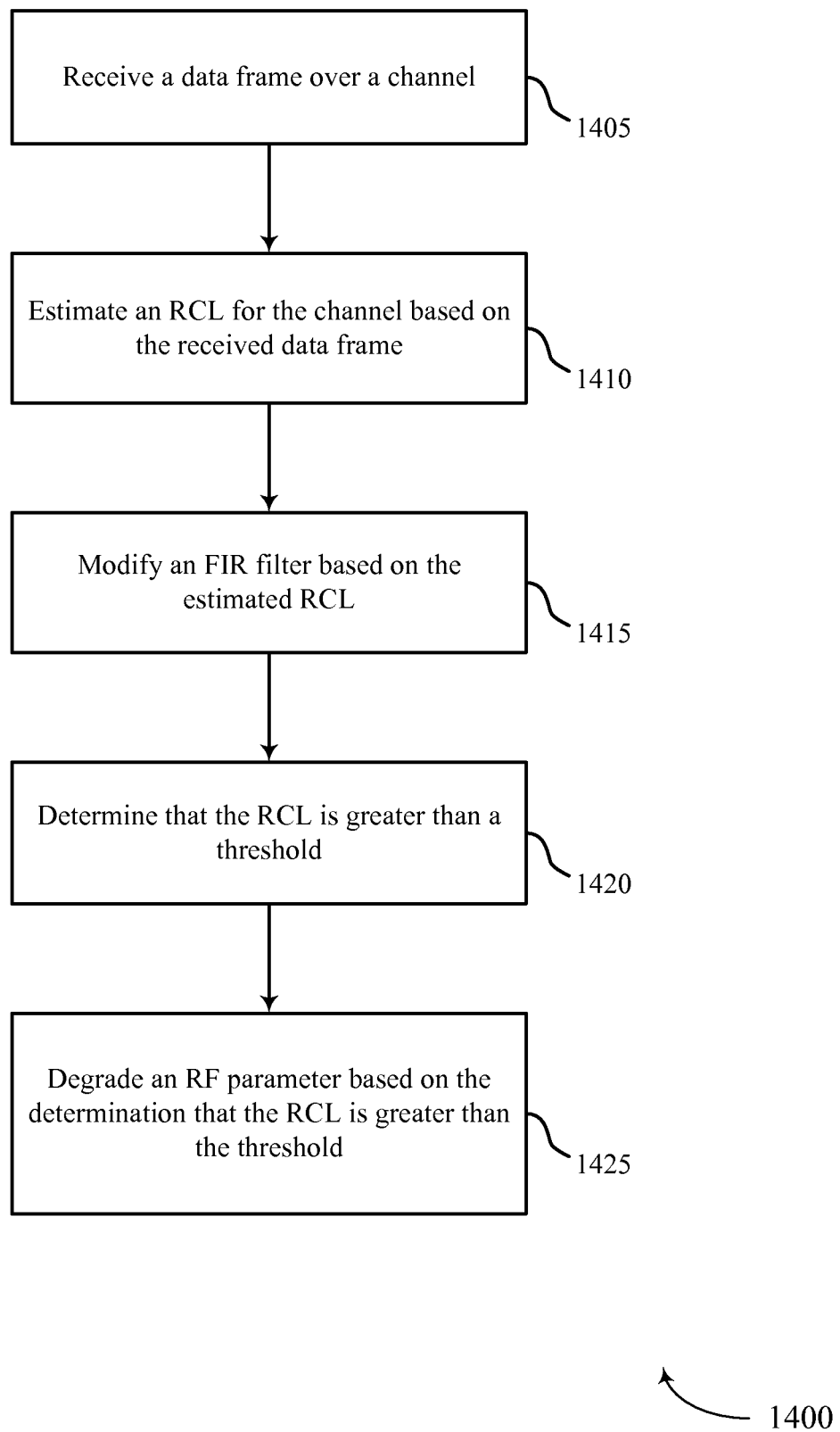
FIG. 14 shows a flowchart illustrating a method for delay spread estimation and utilization in accordance with various aspects of the present disclosure.

FIG. 14 shows a flowchart illustrating a method 1400 for delay spread estimation and utilization in accordance with various aspects of the present disclosure. For clarity, the method 1400 is described below with reference to aspects of one or more of the devices described with reference to FIGS. 1-8. The operations of method 1400 may be implemented by a wireless communication device 501 or its components as described with reference to FIGS. 1-8. In certain examples, the operations of method 1400 may be performed by the delay spread module as described with reference to FIGS. 5-8. In some examples, a wireless communication device may execute sets of codes to control the functional elements of the wireless communication device to perform the functions described below. Additionally or alternatively, the wireless communication device may perform the functions described below using special-purpose hardware. The method 1400 may also incorporate aspects of methods 900, 1000, 1100, 1200, and 1300 of FIGS. 9-13.

At block 1405, the wireless communication device may receive a data frame over a channel as described above with reference to FIGS. 2-4. In certain examples, the operation(s) of block 1405 may be performed by the receiver 505 as described above with reference to FIG. 5.

At block 1410, the wireless communication device may estimate an RCL for the channel based on the received data frame as described above with reference to FIGS. 2-4. In certain examples, the operation(s) of block 1410 may be performed by the RCL estimator 605 as described above with reference to FIG. 6.

At block 1415, the wireless communication device may modify an FIR filter based on the estimated RCL as described above with reference to FIGS. 2-4. In certain examples, the operation(s) of block 1415 may be performed by the filter controller 610 as described above with reference to FIG. 6.

At block 1420, the wireless communication device may determine that the estimated RCL is greater than a threshold as described above with reference to FIGS. 2-4. In certain examples, the operation(s) of block 1420 may be performed by the transmitter 515 as described above with reference to FIG. 5.

At block 1425, the wireless communication device may degrade an RF parameter based on the determination that the estimated RCL is greater than the threshold, wherein the RF parameter is associated with a transmit EVM as described above with reference to FIGS. 2-4. In certain examples, the operation(s) of block 1425 may be performed by the receiver 505 and/or the transmitter 515 as described above with reference to FIG. 5.

Thus, methods 900, 1000, 1100, 1200, 1300, and 1400 may provide for delay spread estimation and utilization. It should be noted that methods 900, 1000, 1100, 1200, 1300, and 1400 describe possible implementation, and that the operations and the steps may be rearranged or otherwise modified such that other implementations are possible. In some examples, aspects from two or more of the methods 900, 1000, 1100, 1200, 1300, and 1400 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a wireless communication device, comprising:
   receiving a first data frame over a channel;
   calculating an amount of excess time in a guard interval (GI) of the first data frame based at least in part on correlating a plurality of starting samples of a sample channel offset estimation interval with a plurality of trailing samples of the sample channel offset estimation interval to identify a duration of the GI that exceeds a sum of a channel delay for the channel and at least a processing period;

determining a residual channel length (RCL) for the channel based at least in part on the calculating; and dynamically adapting a number of taps for a finite impulse response (FIR) filter for a second data frame directly following the first data frame, the dynamically adapting based at least in part on the determined RCL for the channel.

2. The method of claim 1, wherein dynamically adapting the number of taps comprises adding a number of additional taps to the FIR filter based at least in part on the determined RCL.

3. The method of claim 1, wherein the determined RCL is a non-negative value, and wherein dynamically adapting the number of taps for the FIR filter is based at least in part on the determined RCL being a non-negative value.

4. The method of claim 1, wherein dynamically adapting the number of taps for the FIR filter comprises adapting a number of taps for the FIR filter based at least in part on a set of received frames comprising the first data frame.

5. The method of claim 1, further comprising:
determining a channel frequency response of the channel based at least in part on the first data frame; and
performing a post-coding operation on the channel frequency response.

6. The method of claim 5, further comprising:
determining a channel impulse response associated with the channel frequency response; and
determining a channel delay spread associated with the determined channel impulse response, wherein the determined RCL is based at least in part on the determined channel delay spread.

7. The method of claim 5, further comprising equalizing data symbols in the first data frame based at least in part on the post-coding operation.

8. The method of claim 1, wherein the dynamically adapting the number of taps for the FIR filter is associated with a tight spectral mask, wherein the tight spectral mask is tighter than an unmodified spectral mask.

9. The method of claim 1, wherein dynamically adapting the number of taps for the FIR filter comprises sending an indication to a peer device to add taps to the FIR filter based at least in part on receiving the first data frame.

10. The method of claim 9, further comprising sending an indication to the peer device to adjust a GI for the second data frame.

11. The method of claim 1, further comprising:
determining that the determined RCL is greater than a threshold; and
increasing or decreasing an output power based at least in part on the determination that the determined RCL is greater than the threshold.

12. The method of claim 11, further comprising degrading a radio frequency (RF) parameter based at least in part on the determination that the determined RCL is greater than the threshold, wherein the RF parameter is associated with a transmit error vector magnitude (EVM).

13. The method of claim 1, further comprising adjusting a GI based at least in part on the determined RCL.

14. The method of claim 1, wherein the calculating the amount of excess time in the GI is further based at least in part on the amount of the GI that exceeds at least one finite impulse response (FIR) filter period.

15. An apparatus for wireless communication at a wireless communication device, comprising:
a receiver for receiving a first data frame over a channel;
a residual channel length (RCL) estimator for calculating an amount of excess time in a guard interval of the first data frame based at least in part on correlating a plurality of starting samples of a sample channel offset estimation interval with a plurality of trailing samples of the sample channel offset estimation interval to identify a duration of the guard interval that exceeds a sum of a channel delay for the channel and at least a processing period and for determining a RCL for the channel based at least in part on the calculating; and
a filter controller for dynamically adapting a number of taps for a finite impulse response (FIR) filter for a second data frame directly following the first data frame, the dynamically adapting based at least in part on the determined RCL for the channel.

16. The apparatus of claim 15, wherein the filter controller comprises: a taps adjuster for adding a number of additional taps to the FIR filter based at least in part on the determined RCL.

17. The apparatus of claim 15, further comprising:
a taps indicator for sending an indication to a peer device to add taps to the FIR filter, wherein the peer device has transmitted the first data frame.

18. The apparatus of claim 15, further comprising:
means for determining that the determined RCL is greater than a threshold; and
means for increasing or decreasing an output power based at least in part on the determination that the determined RCL is greater than the threshold.

19. The apparatus of claim 18, further comprising a radio frequency (RF) controller for degrading a radio frequency (RF) parameter based at least in part on the determination that the determined RCL is greater than the threshold, wherein the RF parameter is associated with a transmit error vector magnitude (EVM).

20. The apparatus of claim 15, further comprising:
means for determining a channel frequency response of the channel based at least in part on the first data frame;
means for performing a post-coding operation on the channel frequency response;
a channel impulse response (CIR) estimator for determining a channel impulse response associated with the channel frequency response, and
means for determining a channel delay spread associated with the determined channel impulse response, wherein the determined RCL is based at least in part on the determined channel delay spread.

21. An apparatus for wireless communication at a wireless communication device, comprising a processor, memory in electronic communication with the processor and instructions stored in the memory, wherein the instructions are executable by the processor to:
receive a first data frame over a channel;
calculate an amount of excess time in a guard interval of the first data frame based at least in part on correlating a plurality of starting samples of a sample channel offset estimation interval with a plurality of trailing samples of the sample channel offset estimation interval to identify a duration of the guard interval that exceeds a sum of a channel delay for the channel and at least a processing period;
determine a residual channel length (RCL) for the channel based at least in part on the calculating; and dynamically adapt a number of taps for a finite impulse response (FIR) filter for a second data frame directly following the first data frame, the dynamically adapting based at least in part on the determined RCL for the channel.

22. The apparatus of claim 21, wherein when dynamically adapting the FIR filter, the instructions are further executable by the processor to adapt a number of taps for the FIR filter based at least in part on a set of received frames comprising the first data frame.

23. The apparatus of claim 21, wherein the instructions are further executable by the processor to:
  determine that the determined RCL is greater than a threshold; and
  increase or decrease an output power based at least in part on the determination that the determined RCL is greater than the threshold.

24. The apparatus of claim 23, wherein the instructions are further executable by the processor to degrade a radio frequency (RF) parameter based at least in part on the determination that the determined RCL is greater than the threshold, wherein the RF parameter is associated with a transmit error vector magnitude (EVM).

25. The apparatus of claim 21, wherein the instructions are further executable by the processor to:
  determine a channel frequency response of the channel based at least in part on the first data frame; and
  perform a post-coding operation on the channel frequency response;
  determine a channel impulse response associated with the channel frequency response; and
  determine a channel delay spread associated with the determined channel impulse response, wherein the determined RCL is based at least in part on the determined channel delay spread.

26. A non-transitory computer-readable medium storing code for wireless communication at a wireless communication device, the code comprising instructions executable by a processor to:
  receive a first data frame over a channel;
  calculate an amount of excess time in a guard interval of the first data frame based at least in part on correlating a plurality of starting samples of a sample channel offset estimation interval with a plurality of trailing samples of the sample channel offset estimation interval to identify a duration of the guard interval that exceeds a sum of a channel delay for the channel and at least a processing period;
  determine a residual channel length (RCL) for the channel based at least in part on the calculating; and
  dynamically adapt a number of taps for a finite impulse response (FIR) filter for a second data frame directly following the first data frame, the dynamically adapting based at least in part on the determined RCL for the channel.

* * * * *